W. HEINRICH.
TROLLEY RETAINER FOR DUMPING BUCKETS.
APPLICATION FILED MAY 16, 1911.
1,015,179.
Patented Jan. 16, 1912.
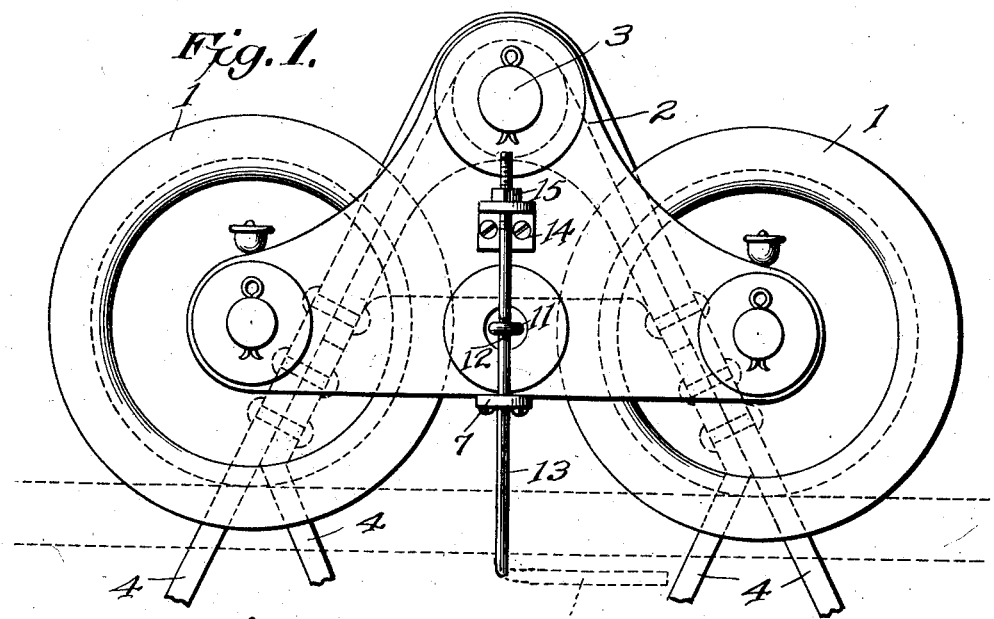
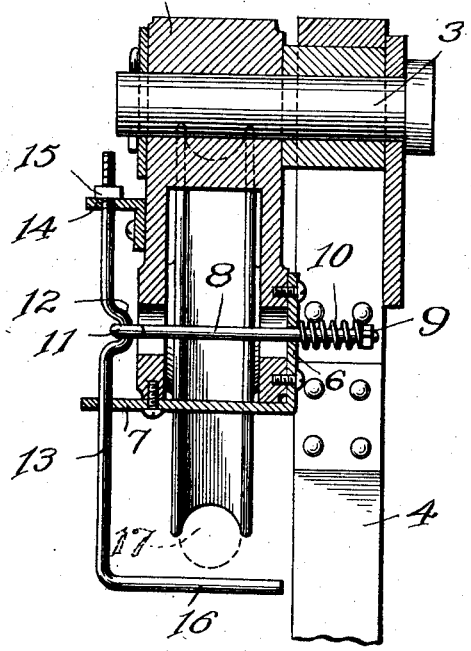
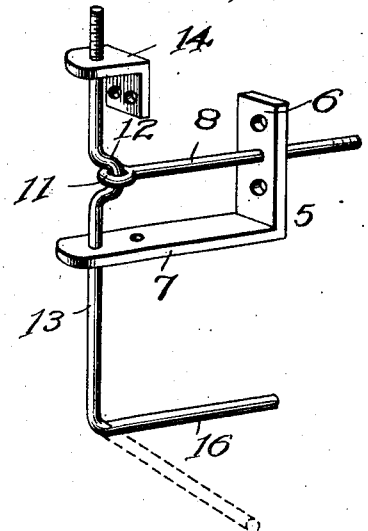
WITNESSES
INVENTOR
William Heinrich

UNITED STATES PATENT OFFICE.

WILLIAM HEINRICH, OF MOSGROVE, PENNSYLVANIA.

TROLLEY-RETAINER FOR DUMPING-BUCKETS.

1,015,179.   Specification of Letters Patent.   Patented Jan. 16, 1912.

Application filed May 16, 1911. Serial No. 627,522.

*To all whom it may concern:*

Be it known that I, WILLIAM HEINRICH, a citizen of the United States, residing at Mosgrove, in the county of Armstrong and State of Pennsylvania, have invented certain new and useful Improvements in Trolley-Retainers for Dumping-Buckets, of which the following is a specification, reference being had therein to the accompanying drawing.

This invention relates to trolleys and has special reference to trolleys from which conveyer buckets are suspended.

The invention has for its object to provide improved means for preventing the trolley wheel from jumping off of the wire and at the same time permit the device for preventing the wheel from jumping off the wire to pass the trolley wire supports.

In the accompanying drawings:—Figure 1 is a side view of the trolley provided with means for preventing it from jumping off of the trolley wire, said means being constructed in accordance with this invention. Fig. 2 is an end view in cross section of a trolley showing the means for preventing it from jumping off of the wire. Fig. 3 is a detail view in perspective of the means constructed in accordance with this invention for preventing the trolley from jumping off of the wire.

To illustrate the manner of carrying out the invention, a pair of trolley wheels 1 are shown mounted in a suitable frame 2, having a transverse rod 3 from which are suspended the arms 4 for supporting a conveyer bucket. The means for preventing the trolley from jumping the trolley wire consists of an angular strip of metal 5 formed with a vertical portion 6 with a horizontal portion 7, the vertical portion 6 being secured to one side of the frame 2 of the trolley, and the horizontal portion 7 extending across the bottom of the frame 2 midway between its ends, as shown in Figs. 1 and 2, and also being secured thereto in any suitable manner. A short rod 8 projects through a hole in the vertical portion 6 of the plate 5 and is slidable therein and has at one end a nut 9 and mounted on the rod 8 between the nut 9 and the vertical portion 6 is a coil spring 10. The other end of the rod 8 is formed with an eye 11 through which extends the curved crank shaped portion 12 of a vertical rod 13 having its upper end projecting through an angular plate 14 secured to the side of the frame 2, said rod 13 being held in place by means of a nut 15. The rod 13 projects through a hole in the horizontal portion 7 of the plate 5 and is rotatable therein and has its lower end formed with a lateral projecting arm 16 which is held normally transverse to the trolley wire 17 by means of the coil spring 10. It will be seen that by means of this construction the arm 10 prevents the trolley wheel from jumping off of the wire 17 and that when the trolley arrives at any of the points on the trolley wire which is supported by uprights beneath that the arm 16 striking against said uprights will be swung to one side, thereby placing the coil spring 10 under tension and when the trolley has passed the point at which said uprights are located the arm 16 will be automatically thrown back to its normal position by the reaction of the coil spring 10.

It will be seen that by means of this invention a very simple and effective device is provided which may be readily attached to a bucket conveyer trolley and is especially adapted for use when the trolley wire is held up by vertical supports beneath it.

What I claim is:—

1. A trolley having a vertical rotatable rod mounted on one side thereof with a lateral arm at its lower end normally located in transverse position to and beneath the trolley, a transverse longitudinally movable rod hinged to the crank of said crank rod, and a compression spring connected to said rod, and holding the lateral arm at the lower end of the crank rod in its normal position and operable to automatically return said lateral arm to its normal position when swung laterally in a horizontal plane.

2. In a device of the kind described, a frame having spaced side members provided with alined centrally disposed openings, trolley wheels mounted in said frame, an L-shaped strip extending across one of said openings and provided with an opening in axial alinement with the opening in the frame side, the remaining portion of said strip extending across and beneath said frame and being provided with an opening vertically disposed in its outer end, means for securing said strip to said frame, a crank rod extending upward through the vertical opening in the strip, a bracket secured to the upper part of said frame and having a journal opening to receive the upper end of the crank rod, a lateral projection extending from the lower end of the crank rod and normally lying transversely beneath the frame, a rod extending through the openings in the frame and the opening in the strip alined therewith, said rod being provided with an eye engaging the crank of the crank rod, a nut on the opposite end of said rod, and a compression spring held between said nut and said strip.

In testimony whereof I hereunto affix my signature in presence of two witnesses.

WILLIAM HEINRICH.

Witnesses:
J. B. COGGON,
H. H. WEYLMAN.

Copies of this patent may be obtained for five cents each, by addressing the "Commissioner of Patents, Washington, D. C."